(12) United States Patent
Willner et al.

(10) Patent No.: US 6,646,774 B1
(45) Date of Patent: Nov. 11, 2003

(54) INTRA-BIT POLARIZATION DIVERSITY MODULATION

(76) Inventors: Alan E. Willner, 9326 Sawyer St., Los Angeles, CA (US) 90035; Zhongqi Pan, 1102 W. 29th St., #7, Los Angeles, CA (US) 90007; Yan Wang, 1150 W. 29 St., #14, Los Angeles, CA (US) 90007; Changyuan Yu, 711 W. $23^{rd}$ St., Los Angeles, CA (US) 90007; Ting Luo, 2353 Portland St., #43, Los Angeles, CA (US) 90007; Asaf B. Sahin, 5377 W. Washington Blvd., #22, Los Angeles, CA (US) 90016; Qian Yu, 20990 Valley Green Dr., #629, Cupertino, CA (US) 95014

( * ) Notice: Subject to any disclaimer, the term of this patent is extended or adjusted under 35 U.S.C. 154(b) by 0 days.

(21) Appl. No.: 10/101,435

(22) Filed: Mar. 18, 2002

Related U.S. Application Data
(60) Provisional application No. 60/276,798, filed on Mar. 16, 2001.

(51) Int. Cl.$^7$ .............................. G02B 6/28; H04B 10/00
(52) U.S. Cl. ......................................... 359/246; 398/65
(58) Field of Search ................................ 359/246, 249, 359/161, 156, 122; 385/24; 398/158, 152, 65

(56) References Cited

U.S. PATENT DOCUMENTS 5,111,322 A * 5/1992 Bergano et al. ............. 359/122
5,473,457 A * 12/1995 Ono ............................ 359/161
6,104,515 A * 8/2000 Cao ............................ 359/161

OTHER PUBLICATIONS

T. Takahashi et al., "Automatic compensation technique for timewise fluctuating polarization mode dispersion in in–line amplifier systems," IEE, Electronics Letters, vol. 30, pp. 348–349, 1994.

F. Heismann, "Analysis of a reset–free polarization controller for fast automatic polarization stabilization in fiber–optic transmission systems," J. Lightwave Technology, 12(4), pp. 690–699, 1994.

Manish Sharma, "Optical Circuits for Equalizing Group Delay Dispersion of Optical Fibers", Journal of Lightwave Technology, vol. 12, No. 10, Oct. 1994.

M.W. Chbat, et al., "Long term field demonstration of optical PMD compensation on an installed OC–192 link," Proc. Optical Fiber Communication Conf., San Diego, CA 1999, Paper PD12.

T. Ono et al., "10 Gb/s PMD compensation field experiment over 452 km using principal state transmission method" Proc. Optical Fiber Communication Conf., Baltimore, MD, 2000, Paper PD44.

R. Khosravani, et al., "Time and Frequency Domain Characteristics of Polarization Mode Dispersion Emulator" IEEE Photonics Technology Letters, vol. 13, pp. 127–129, 2001.

* cited by examiner

*Primary Examiner*—Scott J. Sugarman
*Assistant Examiner*—Richard Hanig
(74) *Attorney, Agent, or Firm*—Fish & Richardson P.C.

(57) ABSTRACT

Techniques and systems for mitigating polarization-related signal degradation or distortions in birefringent optical links based on intra-bit polarization diversity modulation.

30 Claims, 8 Drawing Sheets

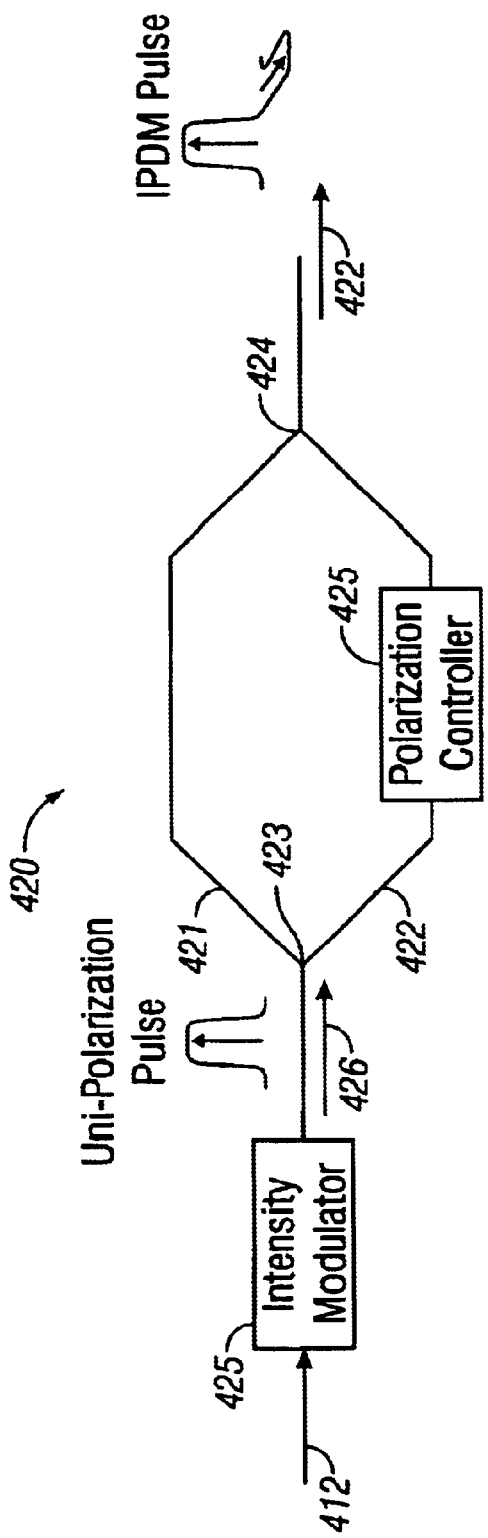
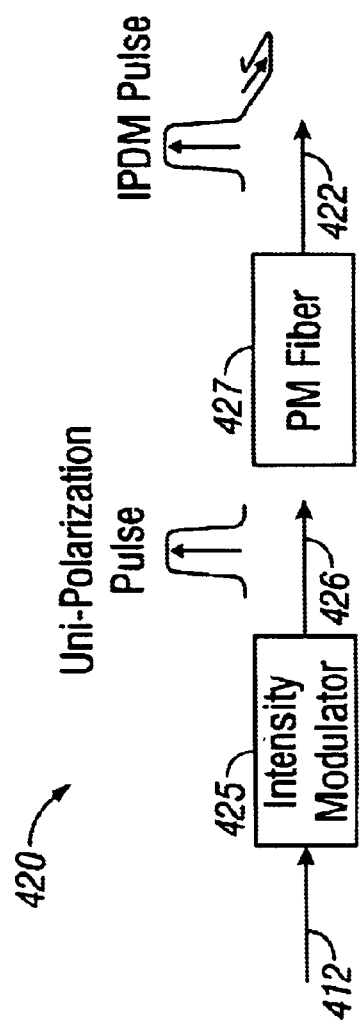
FIG. 4A
FIG. 4B

INTRA-BIT POLARIZATION DIVERSITY MODULATION

This application claims the benefit of U.S. Provisional Application No. 60/276,798 filed Mar. 16, 2001, the entire disclosure of which is incorporated herein by reference as part of this application.

BACKGROUND

This application relates to techniques for reducing or mitigating polarization-related signal distortion effects in optical media such as optical fibers.

Some optical transmission media such as optical fibers are optically birefringent, i.e., exhibiting different refractive indices for light with different polarizations along two orthogonal principal directions. An optical signal having polarization components along the two orthogonal principal directions for each frequency, thus, may be distorted after propagation through such a transmission medium since the two components propagate in different group velocities. This optical dispersion is generally referred to as polarization-mode dispersion ("PMD").

The degree of PMD may be approximately characterized by the average differential group delay ("DGD") between two principal states of polarization. Typical causes for such birefringence in fibers include, among others, imperfect circular core and unbalanced stresses in a fiber along different transverse directions. The axis of birefringence of the optical fiber may change randomly, e.g., in the time period from milliseconds to hours depending on the external conditions in some fiber systems. Therefore, the DGD in an actual PMD fiber is not a fixed value but a random variable that fluctuates over time.

Such polarization-mode dispersion is undesirable in part because the associated pulse broadening may adversely limit the transmission bit rate, the transmission bandwidth, and other performance factors of an optical communication system. In fact, PMD is one of key limitations to the performance of some high-speed optical fiber communication systems at or above 10 Gbits/s per channel due to the fiber birefringence.

SUMMARY

This application includes techniques for generating optical pulses with two orthogonal polarizations within each pulse for reducing or mitigating polarization-related distortion effects, e.g., PMD and cross-phase modulation, on the pulses at the receiving end after transmission through an optical link. The portion of the transmitted optical signal in either one of the two principal states of polarization of the transmission medium is selected at the receiving end for detection.

Accordingly, in one embodiment, optical pulses are transmitted through a birefringent optical link, where each optical pulse has a first pulse portion in a first optical polarization and a second pulse portion immediately adjacent to the first pulse portion without overlap and in a second, orthogonal optical polarization. The transmitted light from the birefringent optical link is then received to select a portion of the received transmitted light for optical detection, where the selected portion is polarized in one of two orthogonal principal states of polarization of the birefringent optical link.

BRIEF DESCRIPTION OF THE DRAWINGS

FIGS. 4A and 4B illustrate two examples of the generator in FIG. 4 for producing the pulses based on the intra-bit polarization diversity modulation.

DETAILED DESCRIPTION

An optical carrier may be modulated to generate optical pulses to send information. Such optical pulses may be in a return-to-zero (RZ) format or a non-return-to-zero (NRZ) format, among other data formats. In various systems, the state of polarization of light in each optical pulse, e.g., during one bit period, generally remains unchanged during the pulse generation.

The techniques, devices, and systems of this application include a polarization diversity modulation method to produce optical pulses where the state of polarization of light changes from one state of polarization to another orthogonal state of polarization in each optical pulse without temporal overlap between two states of polarization. In digital communication, each optical pulse may be used to represent a single digital bit. Hence, the pulse duration is the bit period. Accordingly, the state of polarization of light changes during one bit period in this polarization diversity modulation method. Because the state of polarization changes within a bit, this polarization diversity modulation method is also referred to as intra-bit polarization diversity modulation (IPDM).

In one implementation, the first half of each optical pulse may be set to a first polarization and the second half may be set to a second polarization that is orthogonal to the first polarization. For example, the first and second polarizations may be two linear polarizations that are perpendicular to each other such as one in the horizontal direction and the other in the vertical direction. For another example, the first polarization may be in a right-hand circularly (or elliptically) polarized state while the second polarization may in a left-hand circularly (or elliptically) polarized state.

Figure 1A:
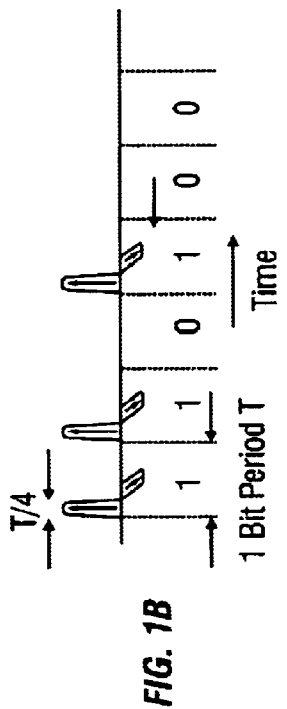
FIGS. 1A and 1B show exemplary formats of optical pulses based on the intra-bit polarization diversity modulation.
Figure 1B:
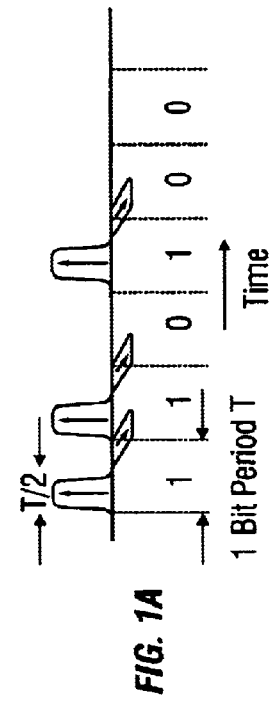

FIGS. 1A and 1B illustrate such IPDM pulses in the NRZ format and the RZ format, respectively, for the same digital bits "110100," where the first polarization is shown to be vertically polarized and the second polarization is shown be horizontally polarized. In the exemplary NRZ format shown in FIG. 1A, the bit "1" is represented by a non-zero amplitude with a change in polarization at one half of the bit period and the bit "0" is represented by a zero amplitude. In the exemplary RZ format shown in FIG. 1B, the bit "1" is also represented by a non-zero amplitude and the bit "0" is represented by a zero amplitude, similar with NRZ format. However, the bit "1" lasts less than one full bit period, leaving a gap with a zero amplitude. For example, in a 50% duty cycle as illustrated, during the one half bit period when the amplitude is not zero, the polarization is at one state of polarization during the first quarter of the bit period and is at the other orthogonal state during the second quarter of the bit period. The amplitude is zero during the second one half bit period.

The above IPDM pulses may be advantageously used in optical transmission systems to mitigate or reduce distortions caused by polarization-related effects during transmission. One such effect is the PMD in birefringent transmission media such as some fibers with optical birefringence. According to one embodiment, only the transmitted light polarized along one of the two mutually orthogonal principal polarizations of the birefringent transmission medium is selected out by using a polarization element, e.g., by a linear polarizer aligned to the selected principal polarization, to filter the light received by an optical receiver during the signal detection.

Figure 2:
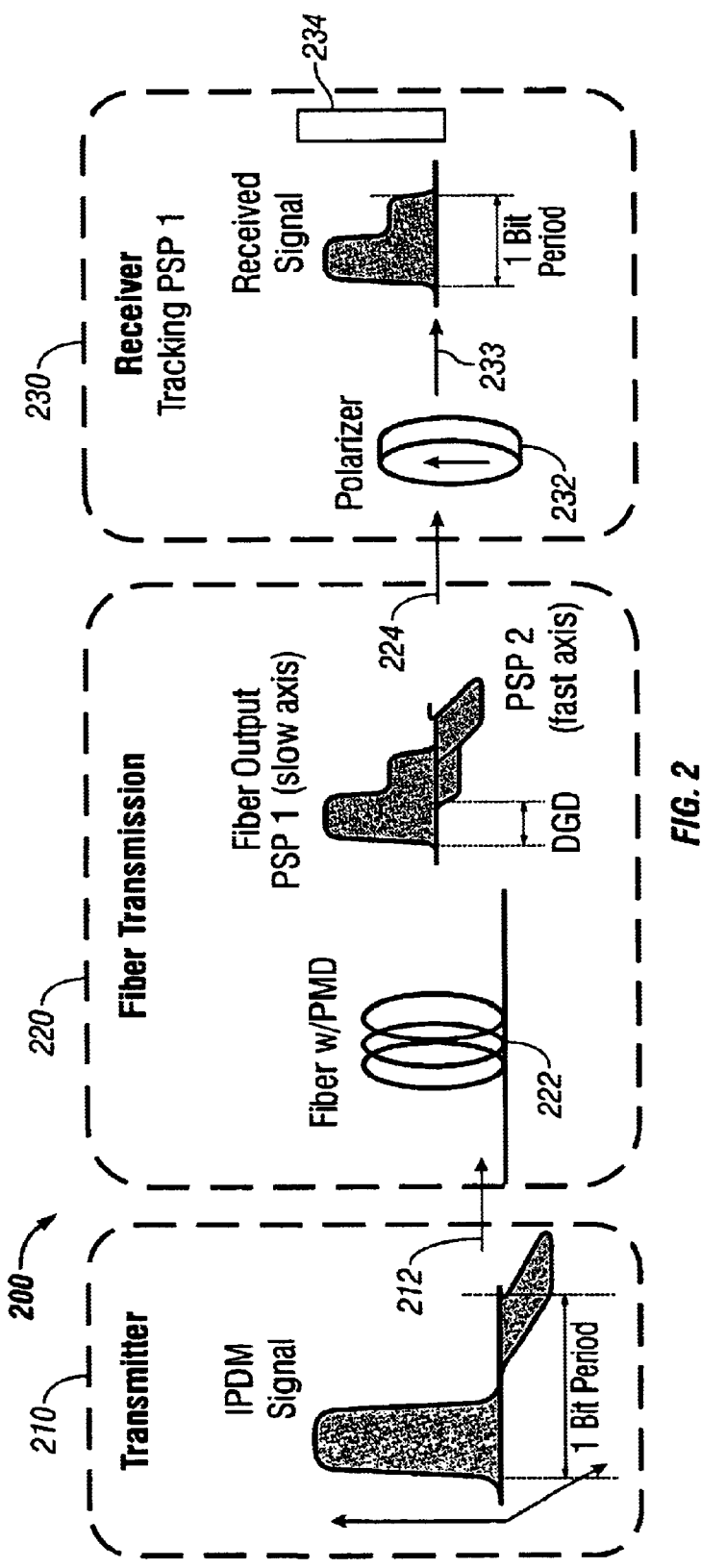
FIG. 2 shows one embodiment of a fiber transmission system based on the intra-bit polarization diversity modulation.

FIG. 2 illustrates one embodiment of a fiber transmission system 200 based on the above IPDM pulse generation and detection. The system 200 includes an IPDM transmitter 210, a fiber transmission stage 220, and a receiver module 230.

The transmitter 210 is designed to produce an optical signal 212 with IPDM pulses. The fiber transmission stage 220 includes a fiber link 222 (e.g., a loop of fiber) with optical birefringence defined by two principal states of polarization, PSP1 and PSP2. The optical birefringence in the fiber link 222 may vary with the location along the fiber to cause different locations in the fiber to exhibit different optical birefringent properties. In addition, the optical birefringence at each location may change with time, e.g., drifting or fluctuating randomly with time, due to local conditions at that particular locale in the fiber 222. Furthermore, the change in the optical birefringence with respect to time at one location in the fiber 222 may be different from that at a different location in the fiber 222. These and other variations in the optical birefringence with respect to location and time cause the birefringence of the fiber 222 to have a varying and complex profile. The two principal states of polarization, PSP1 and PSP2, represent the net effective birefringence of the entire fiber loop 222 at each moment of time and may change with time. The principal states of polarization, PSP1 and PSP2, are orthogonal to each other and may be in various forms, such as two mutually perpendicular linear polarizations, one in a right-hand circularly polarized state and the other in a left-hand circularly polarized state, or one in a right-hand elliptically polarized state and the other in a left-hand elliptically polarized state.

The receive module 230 is positioned to receive the output light 224 from the fiber loop 222 and may include, among other components, at least a polarization element 232 and an optical detector 234. The polarization element 232 is operable to select either one (e.g., PSP1) of the two principal states of polarization, PSP1 and PSP2, of the fiber loop 222. In particular, the polarization element 232 is adjustable to follow the PSP1 since the birefringence in the fiber loop 222 may fluctuate over time. A detection mechanism may be implemented to measure, either directly or indirectly, the polarization states of PSP1 and PSP2 of the fiber link 222 so that the polarization element 232 may be dynamically controlled to follow the time-varying PSP1.

For example, assuming the PSP1 and PSP2 of the fiber link 222 are linear polarizations and change their linear directions with time. A rotatable linear polarizer, for example, may be used as the polarization element 232. The light transmitted through the polarizer 232, indicated by a numeral 233, is polarized along the PSP1 direction and is received by the optical detector 234. The remaining light polarized along the PSP2 is filtered out by the polarizer 232 and thus is not received by the optical detector 234 for detection. The linear polarizer is operable, e.g., by engaging to a rotor, to adjust its direction in response to a control signal to follow the changing PSP1 of the fiber link 222.

As stated above, the principal states of polarization, PSP1 and PSP2, of the fiber link 222, may not be linearly polarized. Accordingly, the polarization element 232 may include a polarization controller followed by a linear polarizer to select either PSP1 or PSP2 for detection. For example, if PSP1 and PSP2 are right-hand and left-hand circularly polarized, respectively, the combination of the polarization controller and the linear polarizer may be adjusted and tuned to follow and select the right-hand circularly polarized PSP1 for detection.

Notably, the above combination of the IPDM pulses and the single polarization detection can substantially ensure that the optical power of the output light 224 in the two principal states of polarization of the fiber loop 222 is nearly equal under almost all conditions. This is because each input IPDM pulse is split equally between two orthogonal polarizations. These two orthogonally-polarized portions are staggered in time next to each other and do not overlap in time. Therefore, these two orthogonally-polarized portions cannot coherently interfere with each other. As a result, to the first order of approximation, the two input polarization states can remain orthogonal to each other. Thus, the signal 233 transmitted through the polarization element 232 to the receiver 234 will be present at all times and its power at the receiver 234 will remain constant regardless of the orientation of the input states with respect to the principal states of polarizations, PSP1 and PSP2, of the fiber loop 222.

Hence, the polarization element 232 may be set to select either PSP1 or PSP2. At the receiver 234, the first-order PMD effect represented by the DGD may be completely compensated for by selecting only one polarization direction using a polarizer without ever losing the signal. FIG. 2 further illustrates, by using changed pulse shapes in two different polarizations, how an IPDM pulse operates in the presence of the first-order PMD in the fiber loop 222.

In addition, since only a single polarization element 232 is controlled to follow the selected polarization axis (PSP1) of the fiber loop 222, this system 200 may have a response speed faster, e.g., by several orders of magnitude, than some PMD compensation systems where multiple polarization elements are to be dynamically adjusted in response to the fluctuations in optical birefringence in the fiber link 222.

Figure 3A:
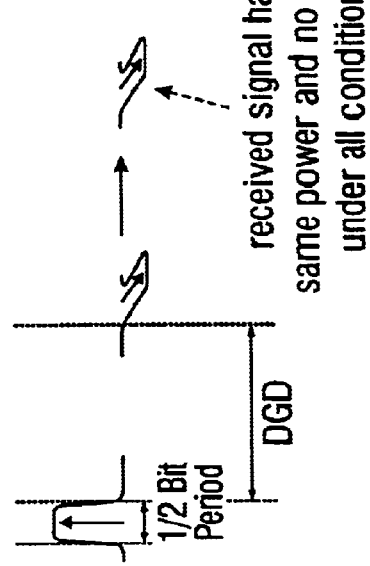
FIGS. 3A and 3B show the intra-bit polarization diversity modulation in two different operating conditions.
Figure 3B:
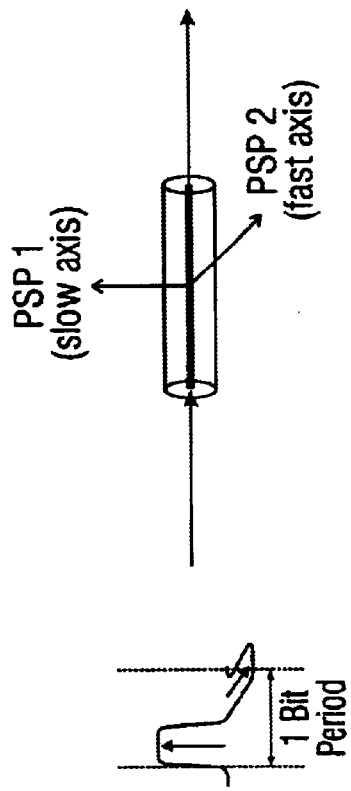

FIGS. 3A and 3B illustrate two special operating conditions of the system 200 shown in FIG. 2. From the optical power point of view, the two polarization states in each optical pulse are complementary signals to the principal states of polarization PSP1 and PSP2 of the fiber link 222. Therefore, the optical power levels in the two PSPs are independent of the angle between the input polarization state and the two principal states of polarization, PSP1 and PSP2, of the fiber link 222. FIG. 3A shows the worst-case scenario where each polarization direction of the input IPDM signal with two orthogonal linear polarizations has an angle of 45° with respect to the linear PSPs of the fiber link 222. The received data is a NRZ signal with the same optical power no matter which one of the two PSPs is selected at detection. FIG. 3B shows the best-case scenario where the two orthogonal linear polarizations of the input IPDM signal are respectively aligned to the two linear PSPs of the fiber link 222. The output signals along the two PSPs are both RZ data due to the delay caused by the PMD between two polarizations and have the same optical power with respect to each other. The power penalty between these two cases is 3 dB which represents the maximum power penalty and is independent of the total DGD of the fiber link 222.

Figure 3C:
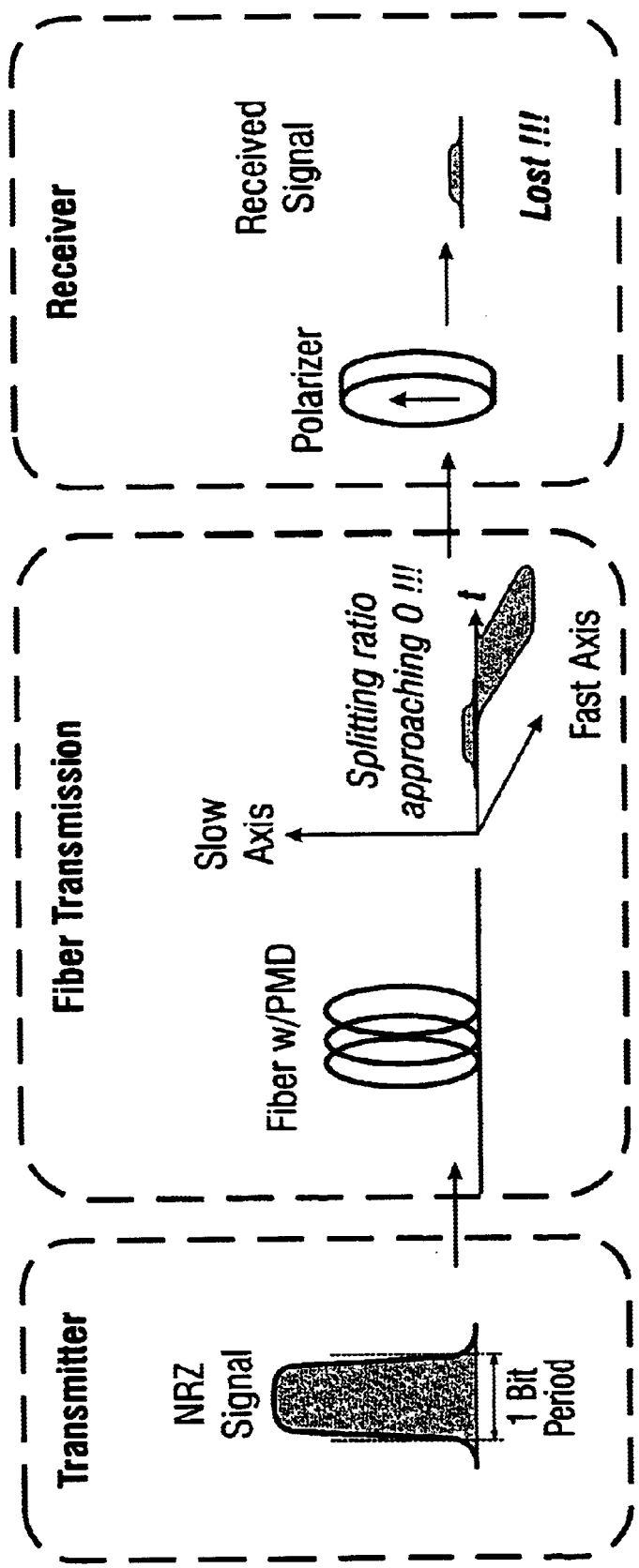
FIG. 3C shows performance degradation in a PMD fiber link with optical pulses without the intra-bit polarization diversity modulation in a worst-case operating condition.

In comparison, FIG. 3C shows a principal state transmission system using the conventional pulses without the above intra-bit polarization diversity modulation. In the receiver, a linear polarizer is used to follow and to align with a selected principal state of polarization of the fiber link. Because the PSPs of the fiber link fluctuate with time, it is possible that the linear polarization of the input signal may be aligned with a principal state of polarization that is not tracked by the linear polarizer in the receiver. Under this worst-case condition, the output signal is essentially lost. In the best-case condition where the linear polarization of the input signal may be aligned with the selected principal state of polarization that is tracked, the detection does not have any power penalty. In other conditions, the power penalty may fluctuate between the best and worst conditions.

Figure 4:
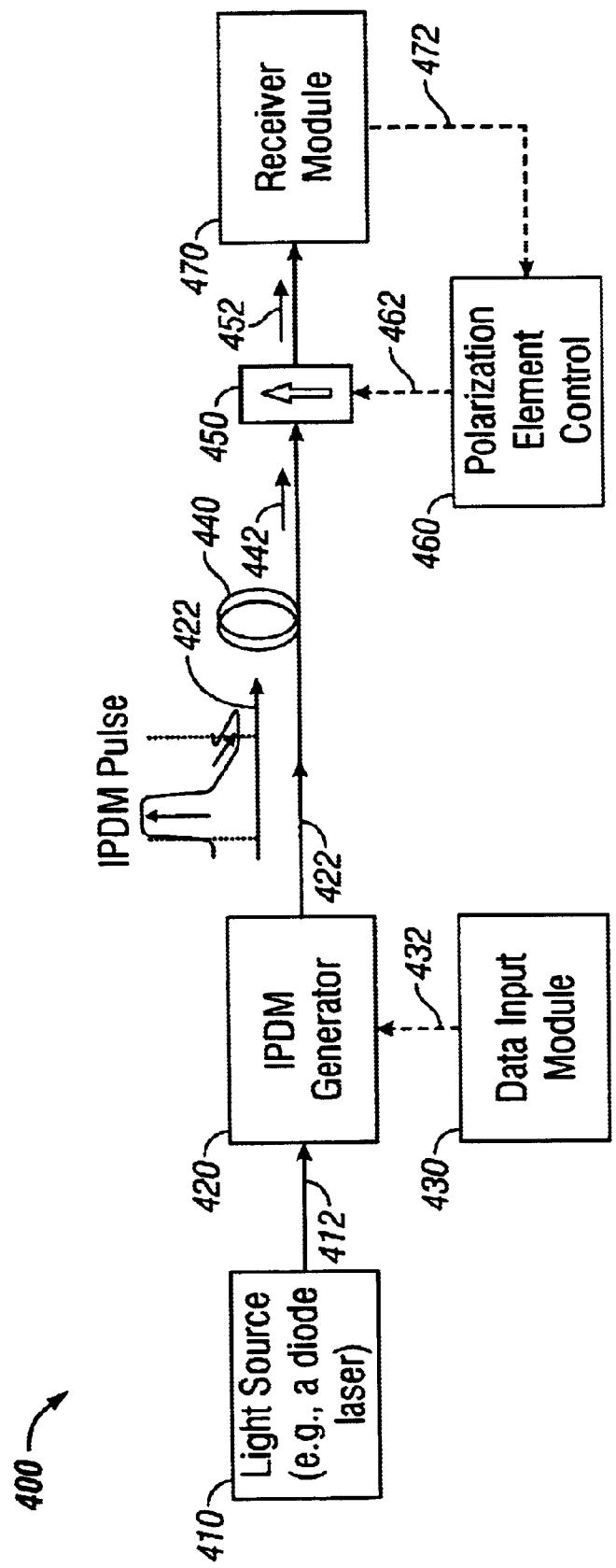
FIG. 4 shows one implementation of a fiber transmission system based on the design in FIG. 2.

FIG. 4 shows one embodiment of a communication system 400 with a birefringent fiber link 440 based on the design in FIG. 2. In the transmitting stage on one side of the fiber link 440, the system 400 includes a light source 410 such as a diode laser or other suitable lasers to produce a beam 412 with a desired polarization, an IPDM signal generator 420, and a data input module 430. The IPDM signal generator 420 modulates the intensity and polarization of the beam 412 to produce an IPDM signal 422 with IPDM pulses in response to a data signal 423 from the data input module 430.

The IPDM signal generator 420 may be implemented to include an intensity modulator for modulating the intensity of the optical beam and a polarization modulator to control or modulate the polarization to produce the desired intra-bit polarization diversity. The polarization modulator may be implemented in various ways. For example, a high-speed polarization controller may be used to control the polarization of each pulse at one polarization in the first half of the pulse and changes it to an orthogonal polarization in the second half of the same pulse.

FIG. 4A illustrates another example of the IPDM generator 420 which has an intensity modulator 425 and the polarization modulator includes two optical paths 421 and 422 with a relative delay of the one half of a pulse duration. A polarization rotator or a polarization controller 425 is placed in one optical path 422. The intensity modulator 425 responds to the signal 432 to produce a pulse train 426 with uni-polarization RZ pulses by modulating the input beam 412. A first optical coupler 423 is used to split the signal 426 into two optical paths 421 and 422. The polarization in the optical path 422 with the optical rotator or controller 425 is changed to be orthogonal to the polarization in the other path in response to a proper clock signal extracted from the signal 432. The two signals are then combined by a second optical coupler 424 to produce an IPDM pulse in the signal 422.

The IPDM generator 420 based on the delay mechanism in FIG. 4A may be alternatively implemented by using a piece of PM fiber 427 with a desired amount of DGD as the polarization modulator to replace the two separate optical paths 421 and 422 and the polarization controller 425. FIG. 4B shows this implementation of the IPDM generator 420 where the PM fiber 427 is oriented to have its two orthogonal PSPs aligned at 45° to the polarization of the RZ signal 426 produced by the modulator 425. The PM fiber 427 may certainly be substituted by a birefringent material with a desired thickness to produce the desired DGD, such as a birefringent crystal.

The receiver stage on the other side of the fiber link 440 of the system 400 includes an adjustable polarization element 450 such as a rotatable linear polarizer, a polarization element control 460, and the receiver module 470 comprising an optical detector and detector circuitry. The adjustable polarization element 450 receives the output signal 442 from the fiber link 440 and is operable to track the time-varying principal states of polarization of the fiber link 440 to select light 452 in one selected principal state of polarization for detection by the receiver module 470. A dynamic control mechanism based on the polarization element control 460 is implemented to adjust the polarization element 450 to track the selected principal state of polarization of the fiber link 440. In general, the polarization element control 460 receives a monitor signal 472 which indicates the current direction of the selected principal state of polarization of the fiber link 440 and produces a control signal 462 to the polarization element 450 to adjust the polarization element 450. The monitor signal 472 may be obtained, for example, by using the detector circuitry in the receiver module 470 or other means to measure a performance parameter. This performance parameter may include the bit error rate obtained from the signal 452. This bit error rate can be used to indicate the degree of the alignment between the polarization element 450 and the selected principal state of polarization of the fiber link 440 and thus operates as an error signal for the alignment. The control 460 responds to this error signal to adjust the polarization element 450 to reduce or minimize the bit error rate.

Figure 5:
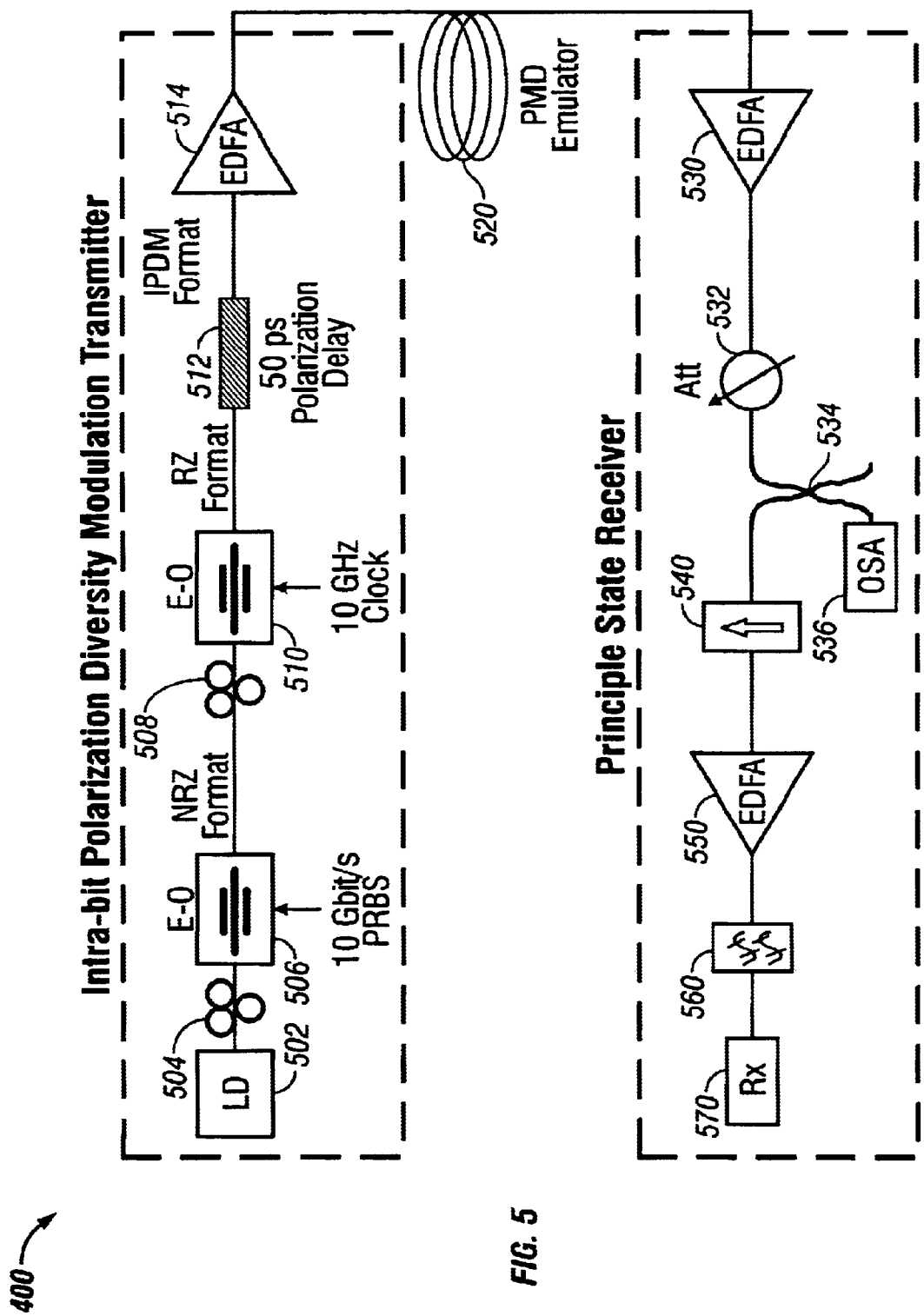
FIG. 5 shows a fiber system that simulates the fiber transmission system shown in FIG. 2 for evaluating the performance of the intra-bit polarization diversity modulation.

FIG. 5 shows a system 500 that simulates a fiber communication system based on the above IPDM design for performance evaluation. A laser diode 502 is used to generate a laser beam. A polarization controller 504 sets the polarization of the laser beam to a desired state. An electro-optic modulator 506 is used to modulate the beam at 10-Gbit/s to produce a NRZ signal where the optical pulses have a desired pulse duration. Another polarization controller 508 is used to control the polarization of the NRZ signal prior to its entry into another electro-optic modulator 510. The modulator 510 is clocked at 10 GHz to periodically eliminate some optical pulses produced by the modulator 506 to produce a 10-Gbit/s RZ signal. The modulation may also be carried at higher bit rates such as 40-Gbit/s. This combination of two EO modulators 506 and 510 may be used to implement the intensity modulator 425 in FIG. 4A. Based on the design shown in FIG. 4B, a piece of PM fiber with 50-ps of DGD is positioned at the output of the modulator 510 and oriented to have its two orthogonal PSPs aligned at 45° to the polarization of the RZ signal to alter the polarization for producing the IPDM pulses. A PMD emulator 520 is then used to simulate a fiber link with optical birefringence to produce either only the first-order PMD or first-order PMD with higher order PMD effects. At the receiving stage, a linear polarizer 540 is aligned to select light polarized in one principal state of polarization of the PMD emulator 520 for optical detection. Optical amplifier 550 and filter 560 are used to improve the signal-to-noise ratio of the signal received by the optical detector 570. The bit error rate is measured from the output of the detector 570 to monitor the performance of the system 500 and to adjust the polarizer 540. An optical splitter 534 is shown to split a monitor beam to an optical spectrum analyzer (OSA) 536 for system diagnostics.

In order to verify the concept of nearly constant received optical power, the power fluctuations are measured by aligning the polarizer 540 to one PSP of the fiber link simulated by the PMD emulator 520 at the receiver. In the simulation system 500, the received optical power varies by only 2.5 dB while rotating the input polarization state, compared to 20 dB for conventional NRZ signals. This power fluctuation is believed to be caused by the non-ideal 45° alignment of the input signal polarization state to the axis of the PM fiber 512 at the transmitter and non-ideal alignment of the polarizer 540 to the selected PSP of the emulator 520 at the receiver.

Figure 6:
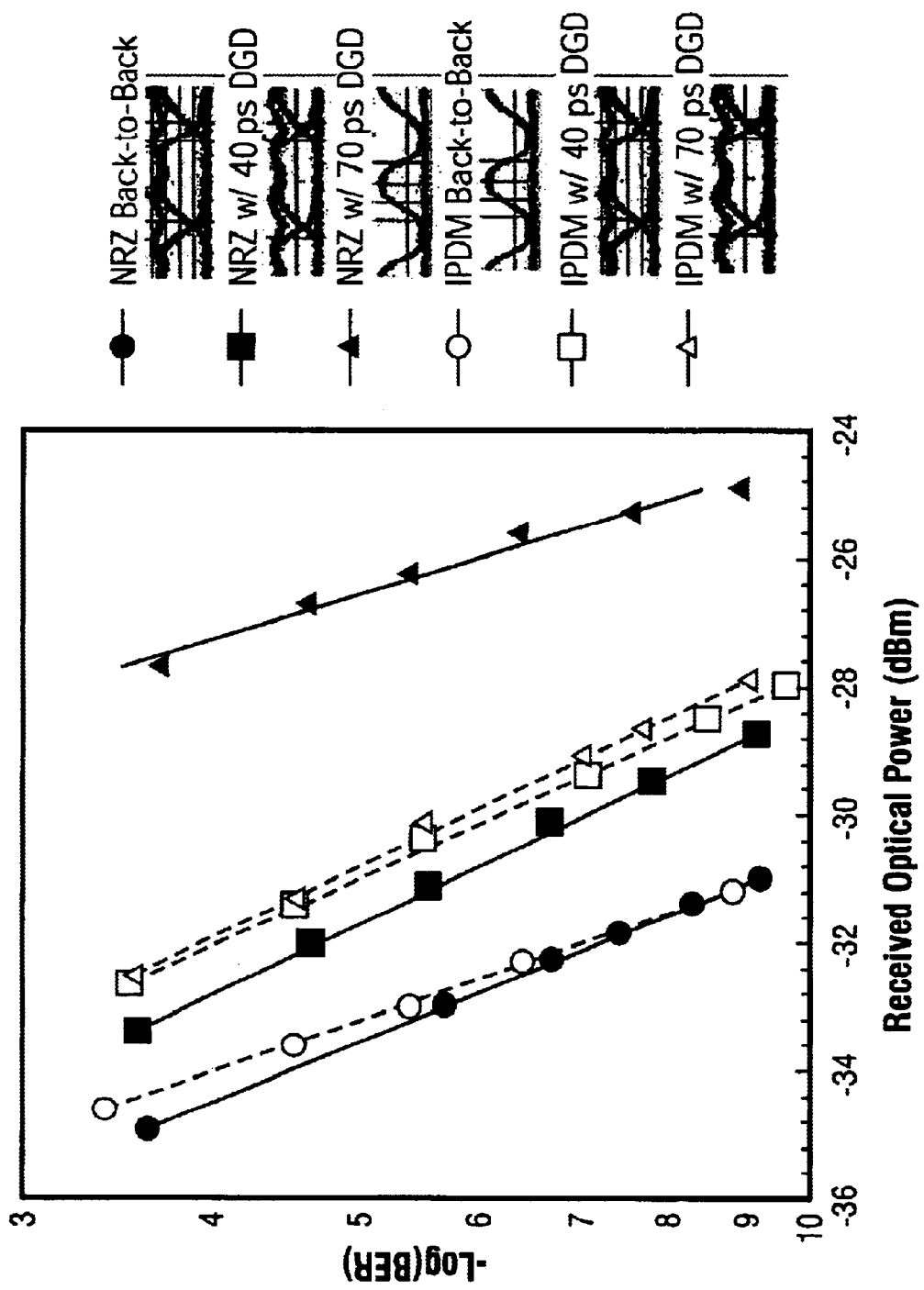
FIGS. 6, 7, and 8 show measurements of the system in FIG. 5.

To assess the first-order PMD compensation abilities of the IPDM technique, different lengths of PM fiber are used as a first-order PMD emulator 520. FIG. 6 shows the compensation results at 0, 40 ps, and 70 ps DGD values. As expected, the worst case occurs when the signal is aligned at 45° to the PSPs and a 3 dB power penalty, i.e., 3 dB power loss at the receiver, is observed. The same power penalty is obtained for both 40-ps and 70-ps DGDs. This result confirms that the power penalty is independent of the DGD value. In contrast, the power penalty for an NRZ signal increases from 2.5 to 6 dB when the DGD value increases from 40 to 70 ps. Therefore, the higher the DGD value, the better performance improvement for the IPDM method. In the IPDM method, one half of the optical power is lost at the receiver, causing a 3 dB back-to-back penalty.

Figure 7:
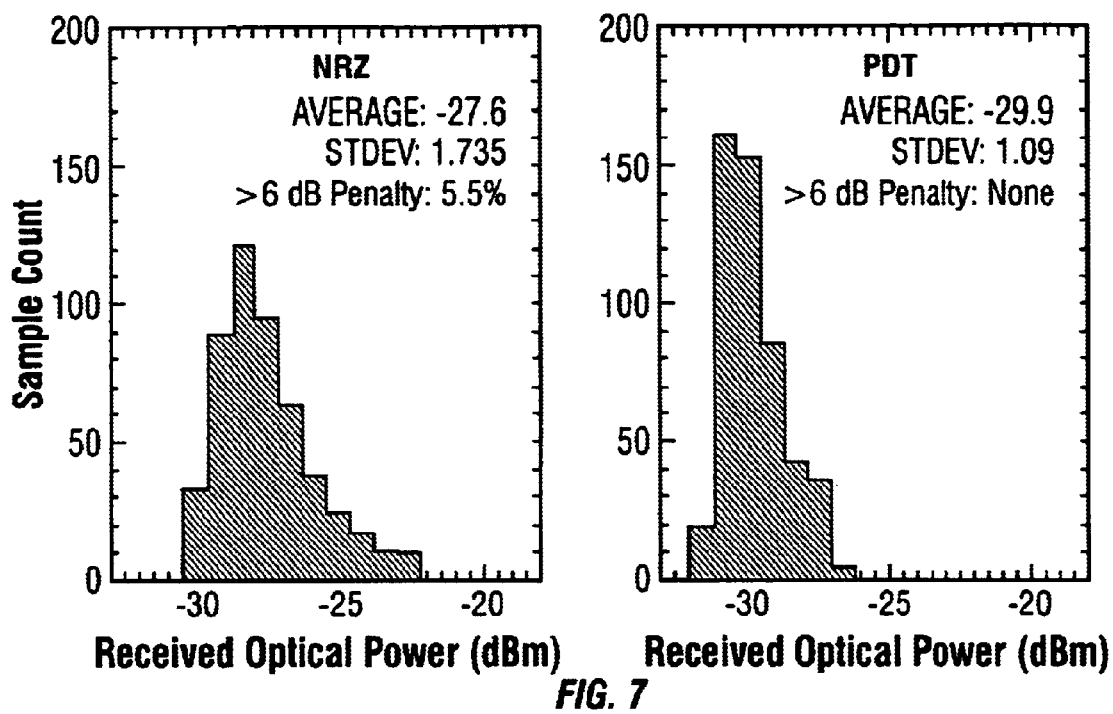
Figure 8:
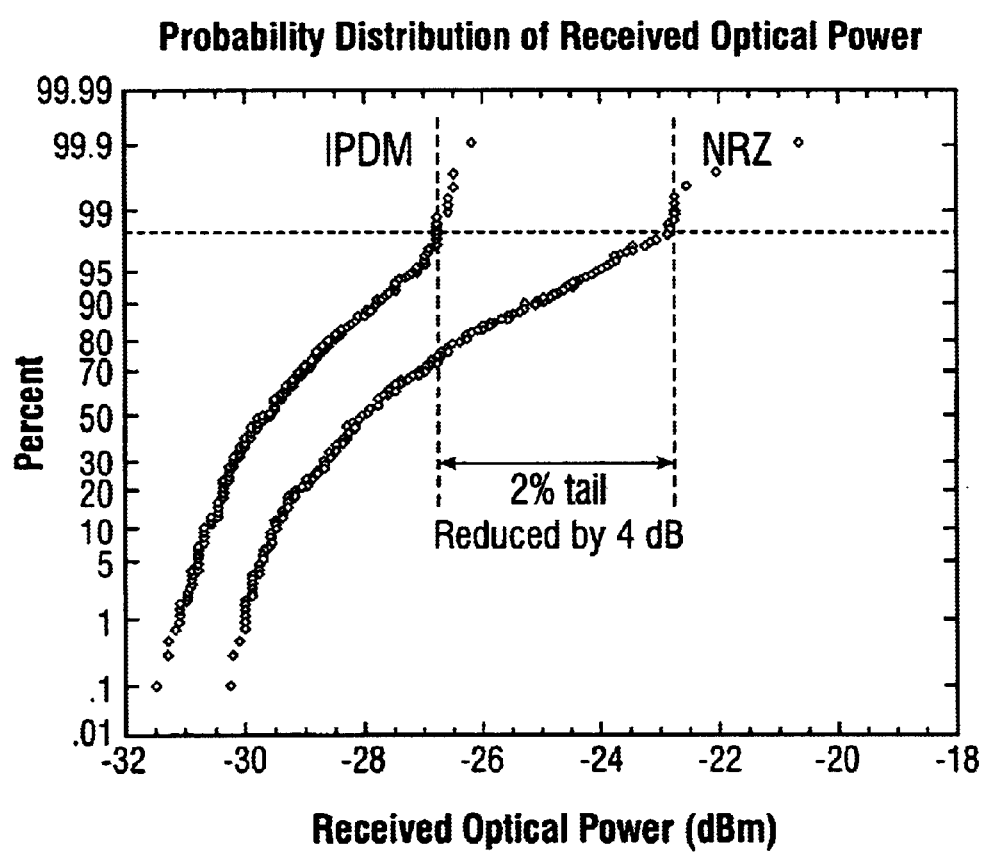

A more realistic PMD emulator, which consists of multiple sections of PM fiber of varied lengths, is also used as the PMD emulator 520 to evaluate the performance in the presence of all-orders of PMD. The average DGD of the PMD emulator is 35 ps. FIG. 7 shows the measured receiver sensitivity distributions. The received optical power to obtain a bit error rate of $10^{-9}$ is measured from 500 samples for both the NRZ and IPDM formats. The probability to have power penalty greater than 6 dB is 5.5% for the NRZ signal. Samples with power penalty greater than 6 dB are not observed for the IPDM case. FIG. 8 further shows that the 2% received optical power tail has a 4 dB improvement when using the IPDM format. By extrapolation, the improvement will be much greater for even lower outage probabilities.

The above IPDM technique may be combined with a frequency chirp in the IPDM pulses at the transmitter to reduce chromatic dispersion in the transmission system. Referring back to FIG. 2, effects of the chromatic dispersion are found to be different for the two orthogonal principal states of polarization of the birefringent fiber link 222. Therefore, in general, it may be difficult to reduce the chromatic dispersion in both polarization states because reduction of the chromatic dispersion associated with one PSP may increase the chromatic dispersion associated with the other, orthogonal PSP. The IPDM system 200 in FIG. 2 can obviate this dilemma in chromatic dispersion compensation by using a technique to reduce the chromatic dispersion associated only with the selected PSP at the receiver 230 because only this selected PSP is measured for the output. Hence, the effect of the technique on the chromatic dispersion in the other orthogonal PSP that is not selected at the receiver 230 is irrelevant and does not affect the detected output. As a result, a predetermined frequency chirp may be added to the pulses generated by the intensity modulator in the IPDM transmitter 210 to mitigate the chromatic dispersion associated with the selected PSP at the receiver 230. This frequency chirp may be tunable to compensate for varying chromatic dispersion in the fiber link 222. A chromatic dispersion feedback may be implemented by using an error signal indicative of the chromatic dispersion, e.g., the bit error rate measured at the receiver 230, to dynamically adjust the frequency chirp at the intensity modulator in the IPDM transmitter 210.

Alternatively, a tunable chromatic dispersion compensator may be placed in the optical path between the polarization element 232 and the optical detector 234 in the receiver 230 to reduce the chromatic dispersion in the signal 233 before it reaches the detector 234. This tunable dispersion compensator may be tunable to compensate for varying chromatic dispersion in the fiber link 222. A chromatic dispersion feedback may be implemented by using an error signal indicative of the chromatic dispersion, e.g., the bit error rate measured at the receiver 230, to dynamically adjust the tunable dispersion compensator. A nonlinearly-chirped fiber Bragg grating, for example, may be used as such a tunable dispersion compensator. The signal 233 is directed into the fiber grating and the reflected signal, whose chromatic dispersion is modified by the fiber grating, is then directed to the detector 234. A grating control is coupled to the fiber grating to tune the grating dispersion in response to the error signal.

As yet another variation, the above tunable chromatic dispersion compensator may be also be placed in the IPDM transmitter 210 to cause a pre-load dispersion that would negate the chromatic dispersion in the fiber link 222.

The above IPDM technique and the systems shown in FIGS. 2 and 4 may further be used to mitigate signal distortions caused by the nonlinear cross-phase modulation in fibers with nonlinear birefringence. The nonlinear birefringence in fibers can cause the state of polarization of a signal to change with the local total optical power on nanosecond time scales and thus may degrade fiber WDM systems. In a WDM link, the presence of other channels can rapidly alter a signal's polarization and dramatically reduce the instantaneous effectiveness of a PMD compensator. Since this effect occurs on the time scale of individual bits, it may be difficult to compensate using regular optical PMD compensators.

In a WDM system where each WDM channel has IPDM pulses, the polarization diversity in each IPDM pulse decreases the degree of polarization in each channel and maintains the optical power constant in any given polarization direction. Therefore, if launched power for all WDM channels are bi-polarized under the IPDM method, the two polarization components of an individual WDM channel will not see any nonlinearly-induced phase difference caused by other WDM channels. Thus XPM-induced polarization fluctuations can be suppressed. Experimental measurements and theoretical simulation have verified that this additional feature of the IPDM technique.

Only a few embodiments are disclosed. However, it is understood that variations and enhancements may be made without departing from the spirit of and are intended to be encompassed by the following claims.

What is claimed is:

1. A system, comprising:
    an optical transmitter to produce at least one optical signal with optical pulses, each optical pulse having a first pulse portion in a first optical polarization and a second pulse portion immediately adjacent to said first pulse portion without overlap and in a second, orthogonal optical polarization;
    an optical transmission link, having optical birefringence with two orthogonal principal states of polarization, coupled to receive and transmit at least said one optical signal;

a polarization element positioned to receive at least said one optical signal from said optical transmission link and to selectively transmit light in one of said two orthogonal principal states of polarization; and an optical detector positioned to receive said light from said polarization element.

2. The system as in claim 1, wherein said optical transmitter includes:

an optical modulator to modulate light intensity to produce a train of optical pulses wherein light in each optical pulse is polarized only in one of said first optical polarization and said second, orthogonal optical polarization; and a polarization unit to cause said first pulse portion in said first optical polarization and said second pulse portion in said second, orthogonal optical polarization in each of said optical pulses.

3. The system as in claim 2, wherein said optical modulator includes an electro-optic modulator.

4. The system as in claim 1, wherein said polarization unit includes a polarization controller operable to change a polarization of light between said first optical polarization and said second, orthogonal optical polarization within each optical pulse.

5. The system as in claim 2, wherein said polarization unit includes first and second optical paths with an optical delay relative to each other, and a polarization controller in said first optical path to change a polarization of light in said first optical path to be orthogonal to a polarization of light in said second optical path.

6. The system as in claim 2, wherein said polarization unit includes a birefringent material with two orthogonal principal birefringent axes oriented to be at 45 degree with respect to the polarization of light from said intensity modulator.

7. The system as in claim 6, wherein said birefringent material includes a PM fiber.

8. The system as in claim 1, further comprising a control unit coupled to adjust said polarization element to maintain transmission of light only in said one of said two orthogonal principal states of polarization when said two orthogonal principal states of polarization change.

9. The system as in claim 8, wherein said control unit receives a monitor signal indicative of an error in adjustment of said polarization element and adjusts said polarization element to reduce said error.

10. A system, comprising:

an optical transmitter to produce at least one optical signal with optical pulses, each optical pulse having a first pulse portion in a first optical polarization and a second pulse portion immediately adjacent to said first pulse portion without overlap and in a second, orthogonal optical polarization;

an optical transmission link, having optical birefringence with two orthogonal principal states of polarization, coupled to receive and transmit at least said one optical signal;

a polarization element positioned to receive at least said one optical signal from said optical transmission link and to selectively transmit light in one of said two orthogonal principal states of polarization;

an optical detector positioned to receive said light from said polarization element; and a control unit coupled to adjust said polarization element to maintain transmission of light only in said one of said two orthogonal principal states of polarization when said two orthogonal principal states of polarization change, wherein said control unit receives a monitor signal indicative of an error in adjustment of said polarization element and adjusts said polarization element to reduce said error, and wherein said monitor signal includes information on a bit error rate in an output of said optical detector.

11. The system as in claim 1, wherein said polarization element includes a polarization controller and a linear polarizer.

12. The system as in claim 1, wherein said polarization element includes a rotatable linear polarizer.

13. A method, comprising:

causing optical pulses to transmit through a birefringent optical link, each optical pulse having a first pulse portion in a first optical polarization and a second pulse portion immediately adjacent to said first pulse portion without overlap and in a second, orthogonal optical polarization; and receiving transmitted light from the birefringent optical link to select a portion of the received transmitted light for optical detection, wherein the selected portion is polarized in one of two orthogonal principal states of polarization of the birefringent optical link.

14. The method as in claim 13, further comprising:

obtaining information on the two orthogonal principal states of polarization of the birefringent optical link during the detection; and dynamically adjusting a polarization-selecting element to maintaining the selected portion of the received transmitted light for optical detection in the selected principal state of polarization of the birefringent optical link.

15. The method as in claim 14, wherein the information is obtained from a performance parameter measured in the optical detection.

16. A method, comprising:

causing optical pulses to transmit through a birefringent optical link, each optical pulse having a first pulse portion in a first optical polarization and a second pulse portion immediately adjacent to said first pulse portion without overlap and in a second, orthogonal optical polarization;

receiving transmitted light from the birefringent optical link to select a portion of the received transmitted light for optical detection, wherein the selected portion is polarized in one of two orthogonal principal states of polarization of the birefringent optical link;

obtaining information on the two orthogonal principal states of polarization of the birefringent optical link during the detection; and dynamically adjusting a polarization-selecting element to maintaining the selected portion of the received transmitted light for optical detection in the selected principal state of polarization of the birefringent optical link, wherein the information is obtained a bit error rate in the optical detection.

17. The method as in claim 13, wherein the optical pulses are in one of a return-to-zero format and a non-return-to-zero format.

18. A system, comprising:

an optical modulator to modulate an intensity of input light to produce a train of optical pulses wherein light in each optical pulse is polarized only in a first optical polarization; and a polarization unit positioned to receive said train of optical pulses to cause a first part of each optical pulse to retain said first optical polarization and a second, immediately adjacent part of each optical pulse to be in a second optical polarization that is orthogonal to said first optical polarization.

19. The system as in claim 18, wherein said first part and said second, immediately adjacent part of each optical pulse are equal in duration.

20. The system as in claim 18, wherein optical modulator includes a first intensity modulator to modulate an intensity of said input light to produce an initial train of optical pulses and a second intensity modulator clocked to eliminate some optical pulses in said initial train of optical pulses to produce said train of optical pulses.

21. A system, comprising:
   a first device to produce a train of optical pulses encoded with information of a data stream, where each optical pulse represents one data bit;
   a second device receiving said train of optical pulses to cause a first pulse portion of each pulse to be in a first optical polarization and a second pulse portion immediately adjacent to said first pulse portion without overlap of said each pulse to be in a second, orthogonal optical polarization;
   an optical communication link to transmit optical output from said second device;
   a polarization device coupled to receive optical output from said optical communication link and operable to select light in only one of said first and said second optical polarizations to produce a selected optical signal; and
   a receiver to receive said selected optical signal and to retrieve said data stream.

22. The system as in claim 21, wherein said second device includes an optical birefringent material.

23. The system as in claim 21, wherein said second device includes two separate optical paths with different path lengths and a polarization element in one of said two separate optical paths to make polarization in said path to be orthogonal to the other path.

24. The system as in claim 21, wherein said polarization device is responsive to a change in polarization caused by said optical communication link in selecting light in said only one polarization to produce said selected optical signal.

25. The system as in claim 24, further comprising a control unit coupled to adjust said polarization device in response to a monitor signal indicative of an error in adjustment of said polarization device, wherein said control unit adjusts said polarization element to reduce said error.

26. The system as in claim 25, wherein said monitor signal includes information on a bit error rate in an output of said receiver.

27. A method, comprising:
   generating optical pulses to present a data stream, wherein each optical pulse represents one data bit, and wherein a first pulse portion of each pulse and a second pulse portion immediately adjacent to said first pulse portion without overlap of said each pulse have orthogonal optical polarizations;
   transmitting said optical pulses over an optical link to a receiver; and
   selecting light in only one of said orthogonal optical polarizations for detection at the receiver to retrieve said dat stream.

28. The method as in claim 27, wherein said orthogonal optical polarizations are linear polarizations.

29. The method as in claim 27, wherein said orthogonal optical polarizations are circular polarizations.

30. The method as in claim 27, wherein said orthogonal optical polarizations are elliptical polarizations.

* * * * *